United States Patent [19]

Inomata et al.

[11] Patent Number: 4,687,069
[45] Date of Patent: Aug. 18, 1987

[54] COOLING STRUCTURE FOR AN ENGINE IN A STRADDLED TYPE VEHICLE

[75] Inventors: Fumio Inomata, Asaka; Tooru Iwadate, Tokyo, both of Japan

[73] Assignee: Honda Giken Kogyo Kabushiki Kaisha, Tokyo, Japan

[21] Appl. No.: 848,061

[22] Filed: Apr. 4, 1986

[30] Foreign Application Priority Data

May 1, 1985 [JP] Japan .............................. 60-64234[U]

[51] Int. Cl.⁴ ............................................. B60K 11/04
[52] U.S. Cl. ................................ 180/68.2; 123/41.33; 180/68.4; 180/229
[58] Field of Search .................... 123/41.33; 180/68.1, 180/68.2, 68.4, 68.6, 229

[56] References Cited

U.S. PATENT DOCUMENTS 3,727,712  4/1973  Colloton .......................... 180/68.4
4,237,996 10/1978  Matsuda et al. .................... 180/229
4,426,960  8/1982  Hart .................................. 123/41.49
4,535,866  4/1983  Shiga ................................. 180/215
4,535,869  8/1985  Tsutsumikoshi et al. ........... 180/215

FOREIGN PATENT DOCUMENTS 560501  7/1923  France .
600454 11/1925  France .
131772  5/1951  Sweden .............................. 123/41.7

Primary Examiner—William A. Cuchlinski, Jr.
Attorney, Agent, or Firm—Armstrong, Nikaido, Marmelstein & Kubovcik

[57] ABSTRACT

A cooling structure for an engine in a straddled type vehicle provided with steerable left and right front wheels and an engine positioned at the center in a forthback direction of a vehicle body is improved in that a cooling fan is disposed in front of the engine and an engine radiator is disposed contiguously to an upper half section of the cooling fan.

8 Claims, 5 Drawing Figures

COOLING STRUCTURE FOR AN ENGINE IN A STRADDLED TYPE VEHICLE

BACKGROUND OF THE INVENTION

1. Field of the Invention

The present invention relates to a cooling structure for an engine in a straddled type vehicle in which a driver straddles a saddle-shaped seat and arbitrarily tilts his body similarly to a motorcycle, and more particularly to an arrangement and a structure of an engine radiator in such straddled type vehicles.

2. Description of the Prior Art

Recently, straddled type buggy cars or dune buggys have been popularized for a leisure purpose or as practically useful cars. This type of car includes a vehicle body frame formed of pipe materials, a rod-like handle and a saddle-shaped seat similarly to the motorcycle, in addition it employs low-pressure tires, hence it can run on a waste land, and when it turns or jumps over an obstacle it is possible to enjoy driving by shifting a center of gravity of a driver's body.

The vehicle discloses in Laid-Open Japanese Utility Model Specification No. 59-146219 is one example of the above-mentioned type of vehicles, and in this vehicle, an engine radiator is positioned in front of an engine, and it is disposed as covered by a vehicle body cover.

In a vehicle of the above-mentioned type, since the engine and the engine radiator are covered by the vehicle body cover, especially it is necessary to take any counter-measure for fully effecting heat radiation upon running under a heavy load at a low speed.

SUMMARY OF THE INVENTION

It is therefore one object of the present invention to provide a cooling structure for an engine in a straddled type vehicle, which can always carry out heat radiation from an engine at a high efficiency.

The above-mentioned object can be achieved in a straddled type vehicle such as a four-wheel buggy car by disposing a cooling fan in front of an engine and disposing an engine radiator continuously to an upper half section of the cooling fan.

According to the present invention, owing to the above-featured relative arrangement of an engine, a cooling fan and an engine radiator, heat radiation from the engine radiator as well as the outer surface of the engine can be promoted by an air flow towards the rear of a vehicle body induced by rotation of the cooling fan, and therefore, the engine can be efficiently cooled even upon heavy-load low-speed driving that is characteristic of the running on a waste land.

The above-mentioned and other objects, features and advantages of the present invention will be come more apparent by reference to the following description of one preferred embodiment of the invention taken in conjunction with the accompanying drawings.

DESCRIPTION OF THE PREFERRED EMBODIMENT

In the following, description will be made on one preferred embodiment of the present invention illustrated in FIG. 1 to 5.

Figure 1:
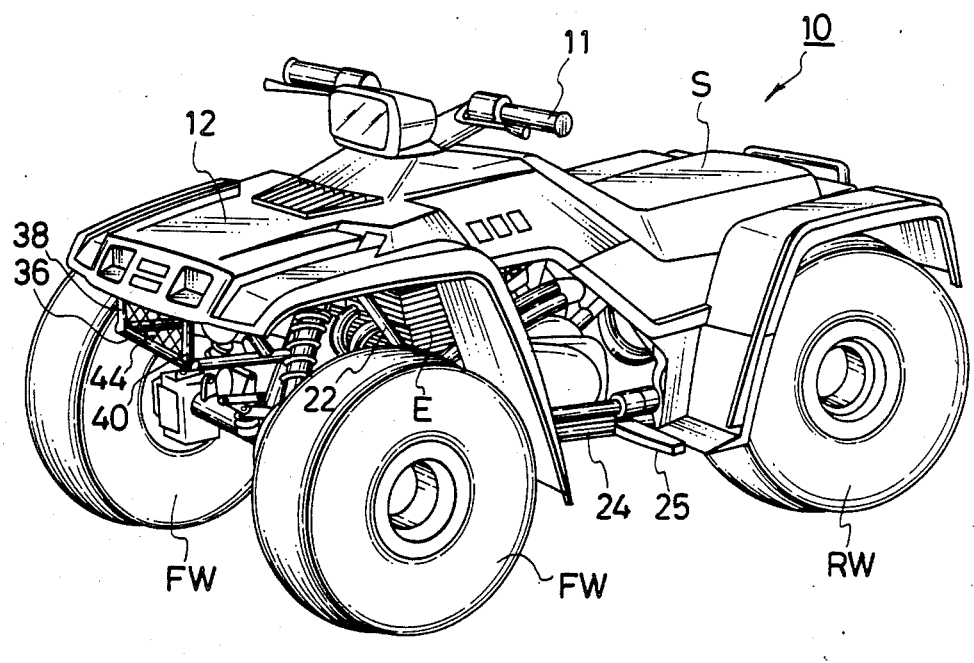
FIG. 1 is a perspective view of a four-wheel buggy car employing the engine cooling structure according to one preferred embodiment of the present invention.
Figure 2:
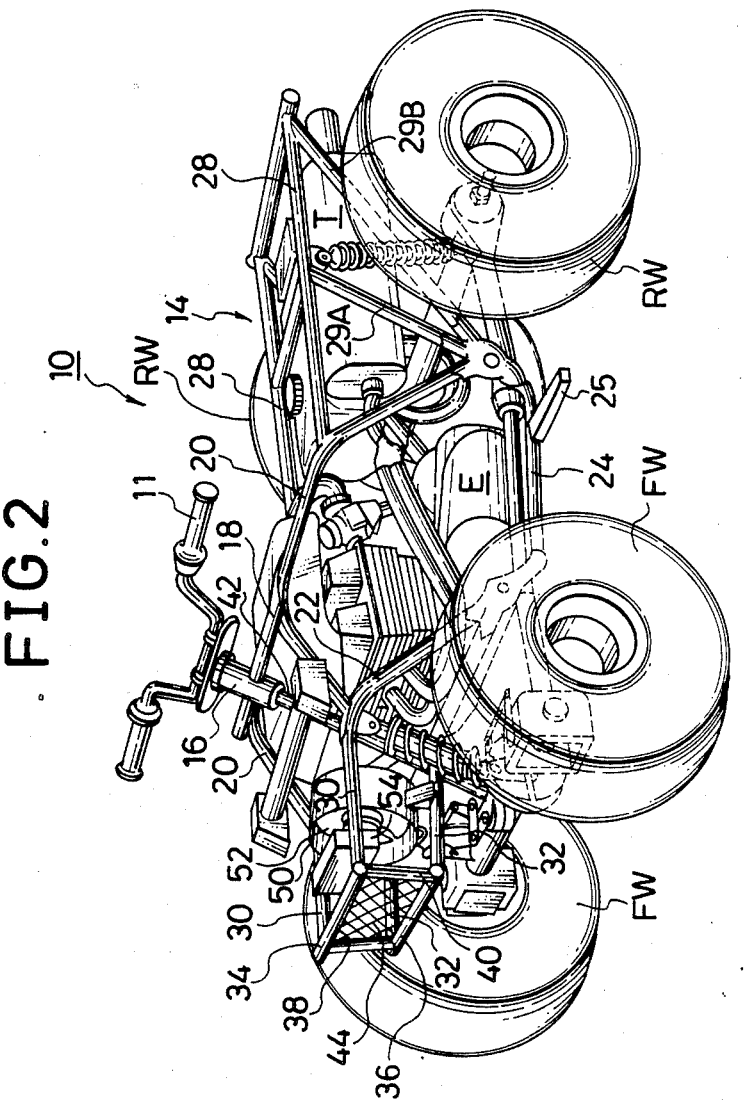
FIG. 2 is a schematic perspective view showing the internal structure of the same buggy car with a vehicle body cover removed.
Figure 3:
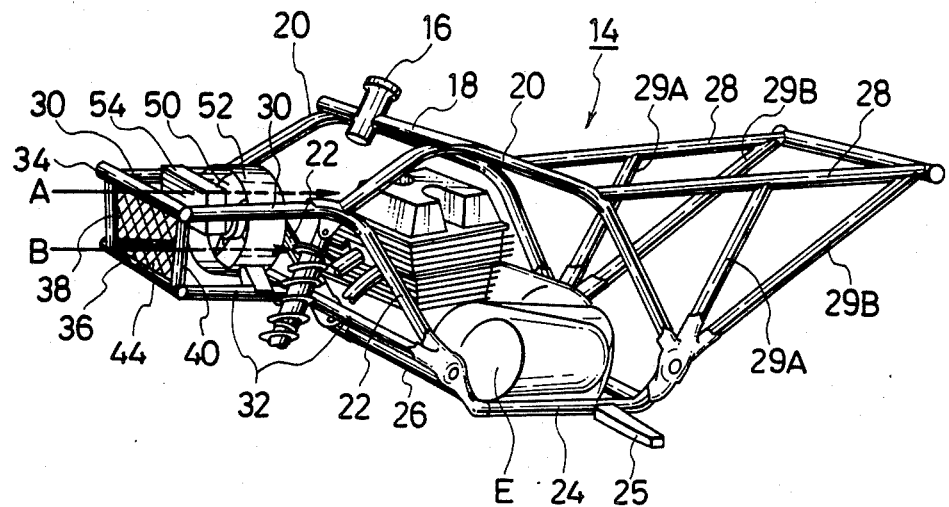
FIG. 3 is a perspective view of an essential part of the internal structure shown in FIG. 2.
Figure 4:
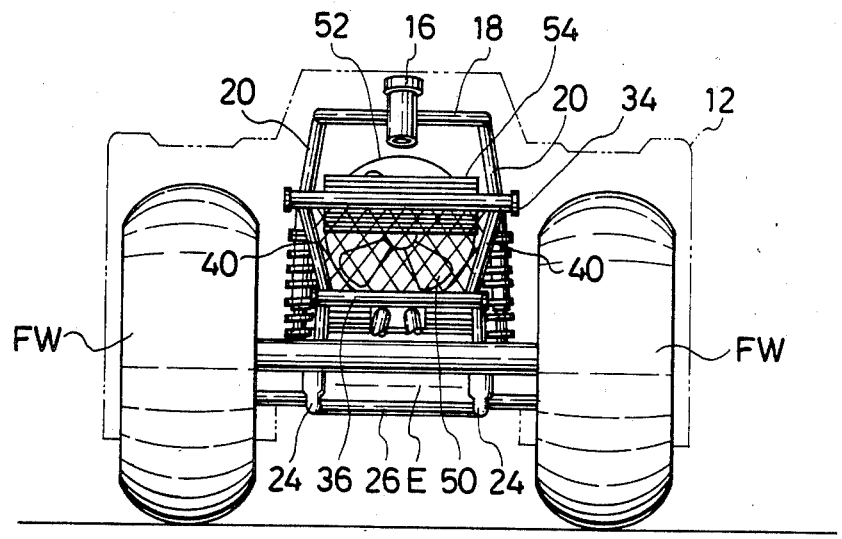
FIG. 4 is a front view of an essential part of the same four-wheel buggy car.
Figure 5:
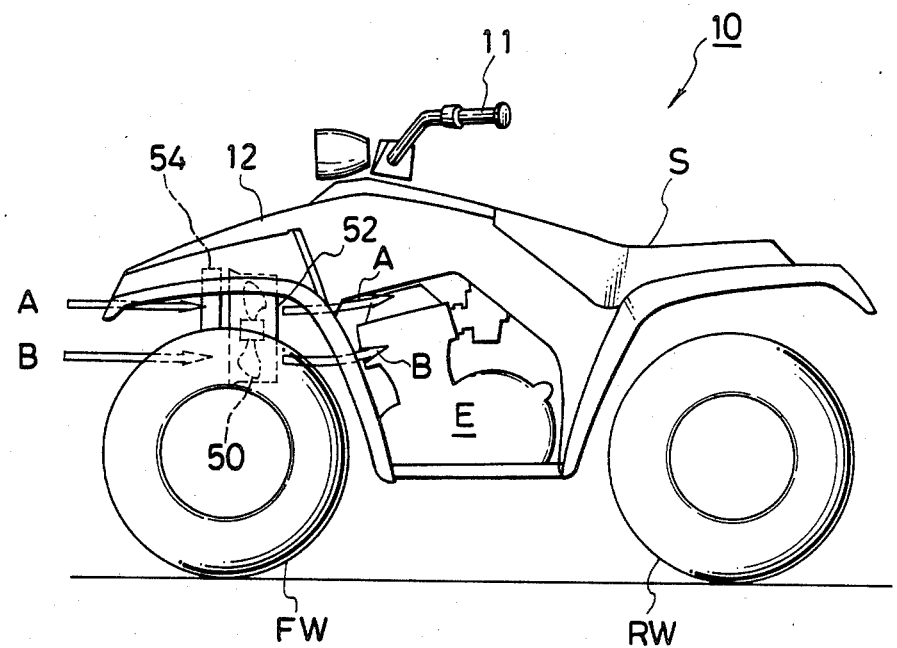
FIG. 5 is a schematic side view of the same buggy car.

FIG. 1 shows a motor buggy car 10 in perspection, and FIG. 2 shows the same motor buggy car schematically with its vehicle body cover 12 removed. The motor buggy car 10 is provided with a rod-like handle 11, and a pair of left and right front wheels FW and a pair of left and right rear wheels RW each equipped with a low-pressure tire called "balloon tire". An engine E is mounted to a vehicle body frame 14 at the central portion in forthback or slanted direction. A fuel tank T is disposed at a high level in the rear portion of the vehicle body. A saddle-shaped seat S is disposed above the engine E and the fuel tank T, and the vehicle body cover 12 is mounted so as to cover the entire vehicle body including the front wheels FW and the rear wheels RW.

The vehicle body frame 14 is formed of principal frame members consisting of a handle rotary shaft tube 16 for rotatably supporting a handle rotary shaft 42, an upper horizontal connecting pipe 18 for supporting the handle rotary shaft tube 16, and a pair of left and right principal frames 20 connected with each other by the upper lateral connecting pipe 18. A pair of left and right tilt pipes 22 extends downwards in front of the engine E. A pair of left and right lower frames 24 are positioned at the lower level of the engine E and connected to the bottom ends of the tilt pipes 22 and the main frames 20, and have foot step members 25 projected therefrom. A lower horizontal connecting pipe 26 connects the left and right lower frames 24 with each other. A pair of left and right seat rails 28 are connected to middle portions of the main frames 20, extending backwards of the vehicle body and supporting the saddle-shaped seat S, and a pair of left and right rear frame members 29A and a pair of left and right rear frame members 29B each connected to the rear ends of the maim frame 20 and the lower frame 24 and support the seat rail 28 from its bottom surface.

Moreover, the left and right tilt pipes 22 are extended forwards of the vehicle body from the portion connected to the main frames 20 to form upper frame members 30, and also, the pair of left and right lower frame members 32 connected to the joint portions between the tilt pipes 22 and the lower frames 24 and extending forwards of the vehicle body are arranged so as to be positioned under the coresponding upper frame members 30. The four members are disposed in parallel to each other, that is, the upper frame members 30, 30 and the lower frame members 32, 32 are connected with each other at their front ends by means of upper and lower horizontal members 34, 36 and left and right vertical members 38, 40. It is to be noted that since the interval between the lower frame members 32, 32 is smaller than the interval between the upper frame members 30, 30, the connected configuration of the horizontal members 34, 36 and the vertical members 38, 40 is a trapezoid (See FIG. 2 to 4).

In addition, a cooling fan 50, provided with a cylindrical shroud 52, is disposed in such manner that most of the cooling fan 50 is positioned in the space surrounded by the upper frame members 30, 30 and the lower frame members 32, 32. An oil cooler or engine radiator 54, for cooling lubricant oil for the engine E, is disposed within the same space so as to be positioned in front of the upper half section of the cooling fan 50. The cooling fan 50 is positioned in front of the cylinders of the engine E, and a net-like member 44 (alternatively a lattice-like member) is associated with the trapezoidal opening delimited by the horizontal members 34, 36 and the vertical members 38, 40 to prevent foreign matters from coming into contact with the oil cooler 54 and/or the cooling fan 50. It is to be noted that the cooling fan 50 and the shroud 52 are supported at four points by the upper frame members 30, 30 and the lower frame members 32, 32, and the oil cooler 54 is supported by the upper frame members 30, 30.

In the illustrated embodiment, since the engine cooling structure is constructed as described above, when the car is operating or running, a running wind indicated by arrow A cools the heat from the lubricant oil as it passes through the oil cooler 54. The air then flows towards the cylinders of the engine E by passing through the inside of the shroud 52, and thus flows backwards through the vehicle body while cooling the heat from the outer surface of engine E. At this time, the cooling fan 50 is appropriately fed with a current to be rotated in response to a signal issued from a lubricant oil temperature detector means, and thereby enhances the cooling effect on the oil cooler 54 and the main body of the engine E. Furthermore, a running wind B, which passes through the inside of the shroud 52 without passing through the oil cooler 54, would directly collide with the engine E and would rob heat from its outer surface. At this moment, since the running wind A, which has passed through the oil cooler 54 and the cooling fan 50 would become a warm wind and would have a tendency to rise slightly, the flow of the running wind B also would associate or combine with the running wind A, and hence, the running wind B would flow favorably towards the cylinders of the engine E. It is to be noted that during the period when the vehicle body is stopped while the engine E is operating, the cooling fan 50 would rotate in response to the lubricant oil temperature to effect cooling of the heat from the outer surfaces of the oil cooler 54 and the engine E (See FIG. 5).

On the other hand, the oil cooler 54 and the cooling fan 50 have their side surfaces and bottom surfaces protected by the upper frame members 30, 30 and the lower frame members 32, 32, and their front surfaces protected by the horizontal members 34, 36, the vertical members 38, 40 and the net-like member 44. Thus, they are hardly subjected to external forces even upon running on a waste land, and so, their durability is excellent. It is to be noted that the reason why the interval between the lower frame members 32, 32 is narrowed, is for the purpose of effectively protecting the cooling fan 50, the shroud 52 and the oil cooler 54 from the external forces, and also for the purpose of facilitating support of the cooling fan 50 and the shroud 52.

In an alternative embodiment, the oil cooler 54 could be disposed behind the upper half section of the cooling fan 50, and in this modified case also, nearly similar effects and advantages to those of the first-described embodiment can be realized.

As will be apparent from the above description, according to the present invention, due to the cooling fan being disposed in front of an engine and an engine radiator being disposed contiguously to the upper half section of the cooling fan, heat radiation from the engine radiator as well as the outer surface of the engine can be promoted by an air flow towards the rear of a vehicle body induced by rotation of the cooling fan, and therefore, the engine can be efficiently cooled even upon heavy-load low-speed driving that is characteristic of the running on a waste land.

Since many changes and modifications can be made to the above-described construction without departing from the spirit of the present invention, it is intended that all matter contained in the above description and illustrated in the accompanying drawings shall be interpreted illustrative and not as a limitation to the scope of the invention.

What is claimed is:

1. A cooling structure for an engine in a dune buggy type vehicle provided with steerable left and right front wheels and an engine positioned at the center in a slanted direction to a vehicle body such as a four-wheel buggy car, said cooling structure comprising:
   a cooling fan disposed in front of said engine;
   an oil cooler engine radiator disposed adjacent to an upper half section of said cooling fan; and
   a pair of left and right upper frame members and a pair of left and right lower frame members extended in front of a handle rotary shaft from a vehicle body frame supporting said engine, at least a principal part of said oil cooler engine radiator being disposed within a space surrounded by said four frame members.

2. A cooling structure according to claim 1, wherein said oil cooler engine radiator is disposed in front of an upper half section of said cooling fan.

3. A cooling structure according to claim 1, wherein said oil cooler engine radiator is disposed behind an upper half section of said cooling fan.

4. A cooling structure according to claim 1, wherein said four frame members form a trapezoidcal shape.

5. A cooling structure according to claim 1, wherein a distance between said left and right upper frame members is larger than a distance between said left and right lower frame members.

6. A cooling structure according to claim 1, further comprising a lattice-like member disposed in front of said space surrounded by said frame members.

7. A cooling structure according to claim 1, wherein at least a principal part of said cooling fan is disposed within said space surrounded by said four frame members.

8. A cooling structure for an engine in a dune buggy type vehicle provided with steerable left and right front wheels and an engine positioned at the center in a slanted direction to a vehicle body such as a four-wheel buggy car, said cooling structure comprising:
   a cooling fan disposed in front of said engine;
   an oil cooler engine radiator disposed adjacent to an upper half section of said cooling fan; and
   a pair of left and right upper frame members and a pair of left and right lower frame members extended in front of a handle rotary shaft from a vehicle body frame supporting said engine, at least a principal part of said oil cooler engine radiator and said cooling fan being disposed within a space surrounded by said four frame members.

* * * * *